United States Patent

Dibble et al.

[11] Patent Number: 5,975,642
[45] Date of Patent: Nov. 2, 1999

[54] SYSTEM FOR TRANSPORTING AND UNLOADING DRY CHEMICALS

[75] Inventors: Merton L. Dibble; Walter P. Panek, both of Kingsport, Tenn.

[73] Assignee: Eastman Chemical Company, Kingsport, Tenn.

[21] Appl. No.: 08/968,416

[22] Filed: Nov. 12, 1997

[51] Int. Cl.$^6$ .................................. B67D 5/06; B60P 1/04
[52] U.S. Cl. ......................... 298/17 R; 296/184; 220/1.5; 220/601; 222/105
[58] Field of Search ................................ 298/7, 17 R, 27; 296/39.1, 15, 181, 184 CR; 406/39, 40, 90, 91; 220/400, 408, 1.5 CR, 601 CR; 222/95, 96, 105 CR, 564; 410/129

[56] References Cited

U.S. PATENT DOCUMENTS

| | | | |
|---|---|---|---|
| 2,712,797 | 7/1955 | Woehrle et al. | 298/17 R |
| 2,764,450 | 9/1956 | Rosener | 298/7 |
| 3,386,605 | 6/1968 | Lafont | 220/1.5 |
| 4,124,136 | 11/1978 | Bjelland et al. | 222/105 |
| 4,799,607 | 1/1989 | Podd | 222/105 |
| 5,096,096 | 3/1992 | Calaunan | 406/91 |
| 5,096,336 | 3/1992 | Merrett et al. | 406/39 |
| 5,302,073 | 4/1994 | Riemersma et al. | 298/7 |
| 5,378,047 | 1/1995 | Merrett et al. | 410/129 |
| 5,547,331 | 8/1996 | Podd et al. | 406/90 |
| 5,562,369 | 10/1996 | Jones | 406/90 |

*Primary Examiner*—Christopher P. Ellis
*Assistant Examiner*—Douglas Hess
*Attorney, Agent, or Firm*—Staas & Halsey

[57] ABSTRACT

A system for transporting and unloading dry chemicals in a container including a removable bulk head and a liner. The bulk head has a top and a bottom. The bulk head is tilted when installed in the container such that the top of the bulk head is at the back of the container and the bottom of the bulk head is recessed into the container. The bulk head has an opening at a bottom center portion thereof. The liner has an opening and fits within the container. The liner has a funnel extension fitting through the opening in the bulk head. The funnel extension has a diameter which decreases toward the opening in the liner, with increasing distance from the bulk head. The funnel extension extends across substantially the entire width of the container. The container has a height, and the removable bulk head has a length extending between the top and the bottom, which length is greater than the height of the container. The system also has an adapter which attaches to the liner. The adapter has a hollow main body having an input and an output and a hollow interior. The opening in the liner fits inside the input of the main body. The adapter has an access door attached to the main body between the input and the output for allowing access to the interior of the main body.

11 Claims, 7 Drawing Sheets

SYSTEM FOR TRANSPORTING AND UNLOADING DRY CHEMICALS

BACKGROUND OF THE INVENTION

1. Field of the Invention

The present invention relates in general to shipment of dry chemicals. More particularly, the present invention relates to an improved system for unloading dry chemicals from a liner within an intermodal container.

2. Description of the Related Art

Dry chemicals are sometimes shipped in intermodal containers. The containers are referred to as "intermodal" because they can be shipped via different modes, such as truck, rail car and ocean liner. More particularly, the intermodal containers may be placed on a chassis to form a trailer which can be pulled behind a tractor. That is, the container plus the chassis form the trailer. Of course, when the container is shipped on sea, the chassis is not attached. To ship the dry chemicals in the container, a liner bag is inserted into the container. The liner bag may be a polymer liner and formed of a material such as polyethylene. The liner can be recycled. The dry chemicals may be in the form of a powder or pellets. An example of a powderous chemical is purified terephthalic acid (PTA). An example of a pellet form chemical is polyethylene terephthalate (PET). To fill the container, there are two openings at the top and back of the liner. Dry chemical is blown into the liner through one of the openings in the liner. Dry chemical may be blown with an inert (perhaps nitrogen) gas. The inert gas is vented from the container through the other opening in the liner. Any residual dry chemical is then filtered from the inert gas before venting.

Hereinafter, the end of the container which would be positioned away from the driver, toward the doors is referred to as the "back" of the container. The dry chemical is loaded and unloaded from the container with the doors of the container open. With the doors open, the liner must be supported by some means, from the back of the container. Conventionally, wood on metal supports were built into the container every time a new liner was to be installed. The supports were in the form of a framed bulk head. To remove the liner, the supports were completely dismantled. Building the bulk head was time consuming and the strength of the bulk head could vary.

To unload the chemical from the container, an outlet is located at the back bottom of the liner. The outlet may be attached to a conduit leading to unloading equipment. Various make-shift approaches, some more successful than others, were used to attach the outlet to the unloading equipment. The container was then tilted, either on its own power or by tilting a ramp on which the trailer was parked. The container could be tilted up to about 45°. The dry chemical may weigh up to 50,000 pounds. For safety reasons, it may be important that a substantial amount of the dry chemical be removed from the liner before the container reaches the 45° tilt. The weight may be too great to be supported by the hand-made bulk head.

One characteristic of dry chemical powders, and all powders for that matter, is the "angle of repose." The "angle of repose" is the steepest angle which the material can form under a given set of conditions. For example, if a powder is poured onto a flat surface, one angle of repose is the angle the resulting mound on the flat surface makes with the flat surface. Generally speaking, the larger the angle of repose, the more difficult it is to achieve flow. For example, if a powder is poured onto a flat surface, next to a ledge and the powder has a small angle of repose, the powder will simply flow off of the ledge. On the other hand, if the powder has a large angle of repose, the powder may form a steep mound next to the ledge, and will not flow off of the ledge. The angle of repose varies from powder to powder. Moreover, in a single powdered chemical, such as PTA, the angle of repose varies from manufacturer to manufacturer.

In the conventional system for transporting and unloading powdered chemicals, the liner conformed to the shape of the container and thus was substantially box-shaped. FIG. 1 is a cross-sectional view of a conventional liner, taken from a plane parallel to and below a top of the liner. The conventional liner had an outlet 2 for unloading the chemical. The outlet is at the bottom middle of the back of the container. Even when the container was completely tilted (FIG. 1 represents a tilted container), powder remained in the liner, extending from ledges 2a of the outlet 2 to the trailer wall 4. The height H to which the powder remains on the wall (depth in a horizontal container) is determined by the angle repose.

Furthermore, in the conventional system, there was not an immediate drop-off after the outlet. That is, when the container was horizontal, the outlet emptied into a conduit which was horizontal for a short distance d before becoming vertical to drop off the back of the container. FIG. 2 is a cross-sectional view of the conventional liner, taken through line II—II of FIG. 1. FIG. 1 shows the liner as being substantially empty and tilted, whereas FIG. 2 shows the liner as being substantially full and horizontal. As can be seen from FIG. 2, when the container was horizontal and the powder had a relatively large angle of repose, there was no discharge of powder. As discussed above, the powder must flow before the container is fully tilted. FIG. 3 is the same view as FIG. 2, but with the container and the liner inclined at an angle with a horizontal to show how the powder flows. As can be seen in FIG. 3, after tilting, powder began to flow. However, a portion P of the outlet was not being used. Thus, the effective diameter of the outlet was reduced by the portion P and discharge of powdered chemical was slow. The buyer of the powdered chemical may require large quantities of the chemical. However, with the conventional transporting and unloading system, unloading the chemical from the liner could require up to six hours. This time increased receiving costs, limited the rate at which the buyer could receive the chemical and thus limited production in the buyer's plant.

SUMMARY OF THE INVENTION

Accordingly, it is an object of the present invention to provide a system for transporting dry chemicals from which the chemicals can be completely unloaded without dead spots remaining to the sides of an outlet.

It is a further object of the present invention to provide a system for transporting and unloading dry chemicals in which the chemicals can be unloaded quickly.

It is another object of the present invention to provide a system for transporting and unloading dry chemicals that does not require building a bulk head every time the liner is changed.

It is a still further object of the present invention to provide a system for transporting and unloading dry chemicals in which discharge equipment is installed by a simple procedure.

These and other objects are accomplished by providing a system for transporting and unloading dry chemicals in a container which includes a removable bulk head and a liner.

The bulk head has a top and a bottom. The bulk head is tilted when installed in the container such that the top of the bulk head is at the back of the container and the bottom of the bulk head is recessed into the container. The bulk head has an opening at a bottom center portion thereof. The liner has an opening and fits within the container. The liner has a funnel extension fitting through the opening in the bulk head. The funnel extension has a diameter which decreases toward the opening in the liner, with increasing distance from the bulk head. The funnel extension extends across substantially the entire width of the container. The container has a height, and the removable bulk head has a length extending between the top and the bottom, which length is greater than the height of the container. The system may employ support pieces recessed into the container behind the bulk head for supporting the sides of the liner away from the container towards the back of the container such that the distance between the sides of the liner and the container increases towards the back of the container.

The system also has an adapter which attaches to the liner. The adapter has a hollow main body having an input and an output and a hollow interior. The opening in the liner may fit around the input of the main body of the adapter. The adapter has an access door attached to the main body between the input and the output for allowing access to the interior of the main body. The liner may be formed of a main liner and an auxiliary liner. In this case, the main liner fits within the input of the main body, inside the hollow interior. The auxiliary liner fits around the input of the main body, on an exterior of the main body. The auxiliary liner has means for fastening to the container. The adapter has a clasp surrounding the input of the main body. The clasp is moveable between open and closed positions such that in the open position, a clearance exists between the clasp and the input of the main body, and in the closed position, the clasp is secured against the auxiliary liner and the input of the main body.

The container has a bed on which the liner rests. A claw portion is attached to the adapter and slides under the bed of the container. The claw portion has a foot and a leg. The foot fits under the bed of the container, and the leg connects the foot in the adapter. The bed of the container has a thickness, and the leg has a height greater than the thickness of the bed of the container for allowing the adapter to be supported above the bed of the container.

BRIEF DESCRIPTION OF THE DRAWINGS

The invention will be readily understood by reference to the following description of specific embodiments described by way of example only, with reference to the accompanying drawings in which like reference characters represent like elements, wherein.

DETAILED DESCRIPTION OF THE PREFERRED EMBODIMENTS

Figure 1:
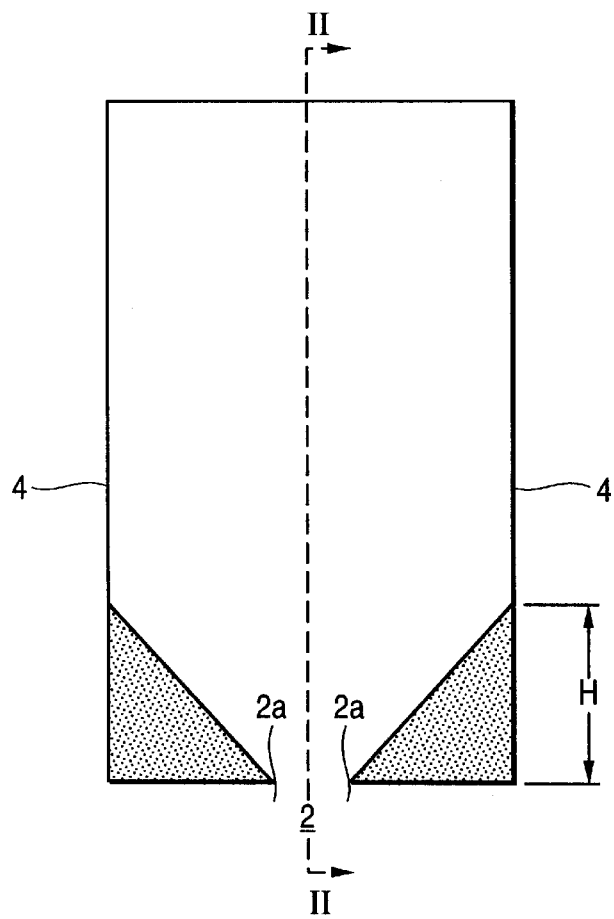
FIG. 1 is a cross-sectional view of a conventional liner, taken from a plane parallel to and below the top of the liner.
Figure 2:
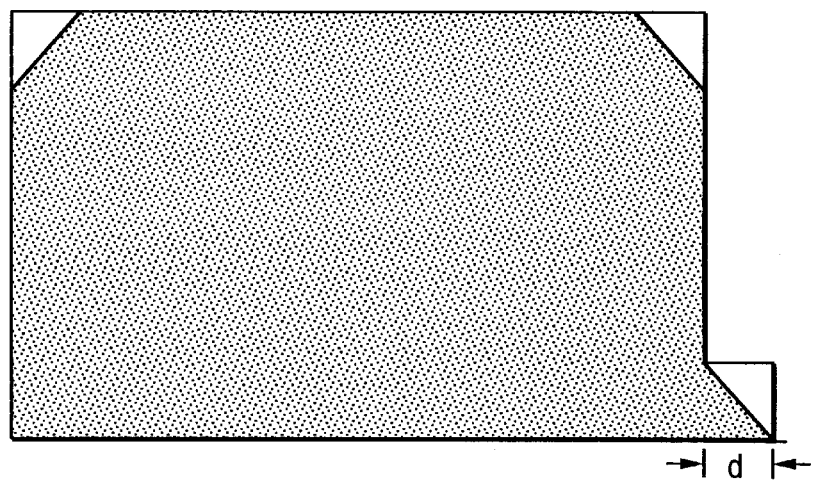
FIG. 2 is a cross-sectional view of the conventional liner, taken through line II—II of FIG. 1.
Figure 3:
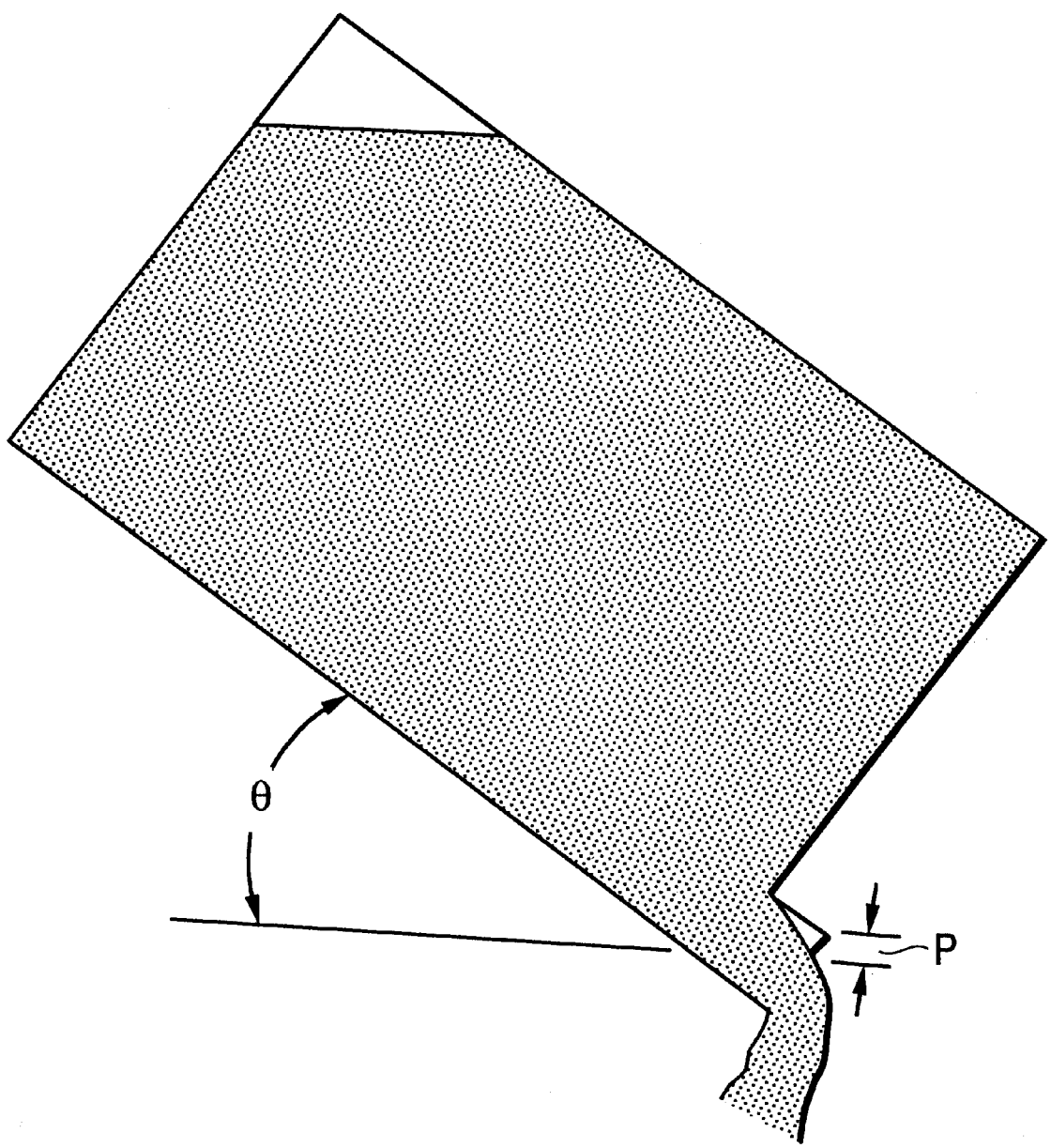
FIG. 3 is a cross-sectional view of the liner of FIG. 2, with the liner tilted.
Figure 4:
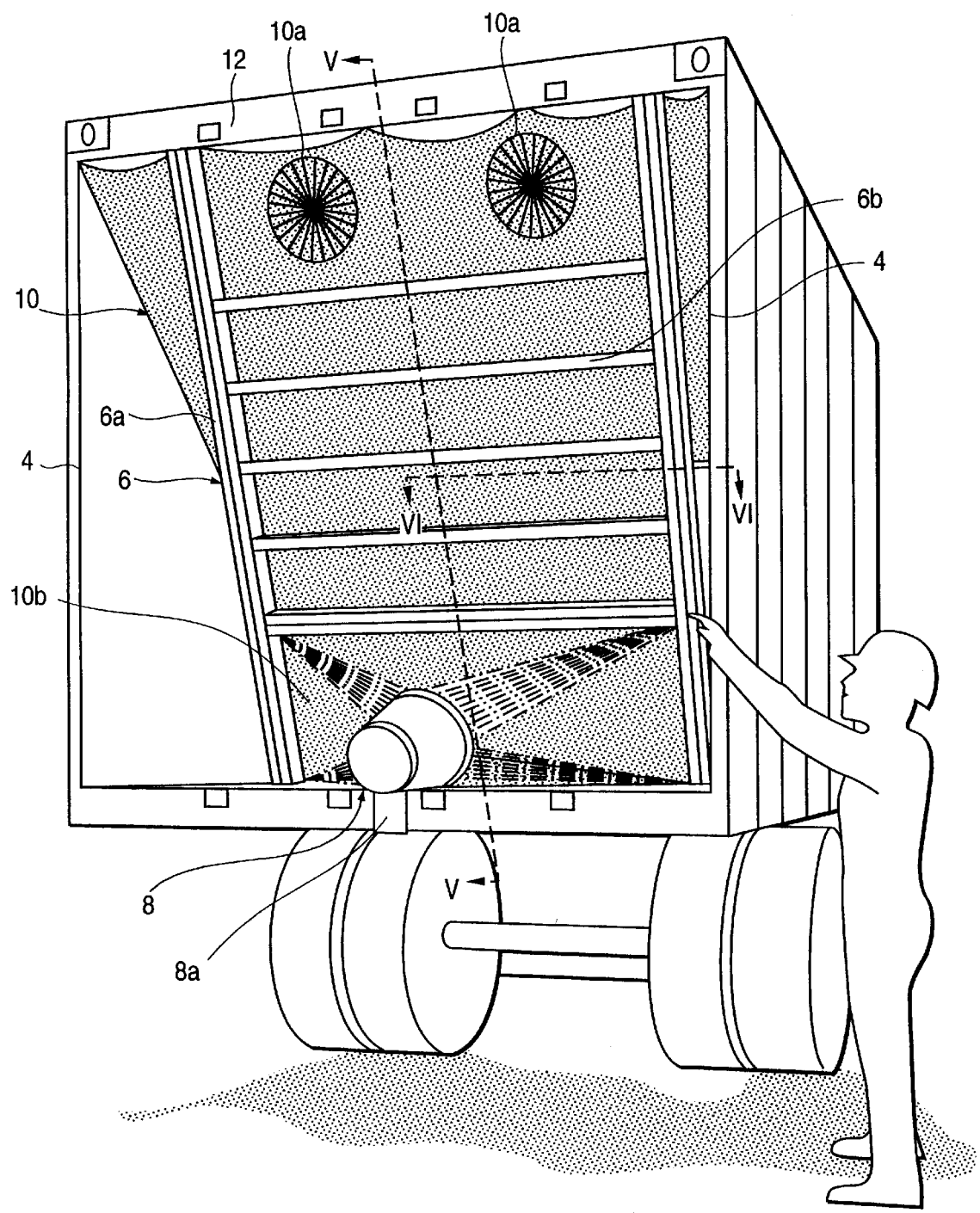
FIG. 4 is a perspective view of a system for transporting and unloading dry chemicals according to the present invention.

FIG. 4 is a perspective view of a system for transporting and unloading dry chemicals according to the present invention. The system of the present invention generally includes a prefabricated bulk head 6, and unloading adapter 8 and an improved liner 10. The prefabricated bulk head 6 is formed from vertical pieces 6a and horizontal pieces 6b fastened together as shown. The bulk head 6 is wedged into the container such that the top of the bulk head abuts a top rail 12 above the door of the container. The bottom of the bulk head 6 is recessed into the container and has angled foot portions for fitting flush against the bed (floor) of the container. The bulk head shown in FIG. 4 does not extend completely to the side ends of the container. However the bulk head 6 could have a width which extends entirely across the width of the container.

The horizontal members 6b of the bulk head 6 may be spaced at regular intervals. A space is provided at the top of the bulk head 6 for openings 10a in the liner 10. The openings 10a serve the same function as the openings in the conventional liner. That is, one opening 10a is used for loading product (dry chemical), and one opening 10a is used for venting gas.

A space is also provided at the bottom of the bulk head 6. This space is for a funnel extension 10b of the liner 10. The funnel extension 10b provides for a gradual change in shape from the liner to a discharge opening thereof. An unloading adapter 8 connects the funnel extension 10b to unloading equipment. The unloading adapter 8 has a leg 8a with a foot extending under the container.

Figure 5:
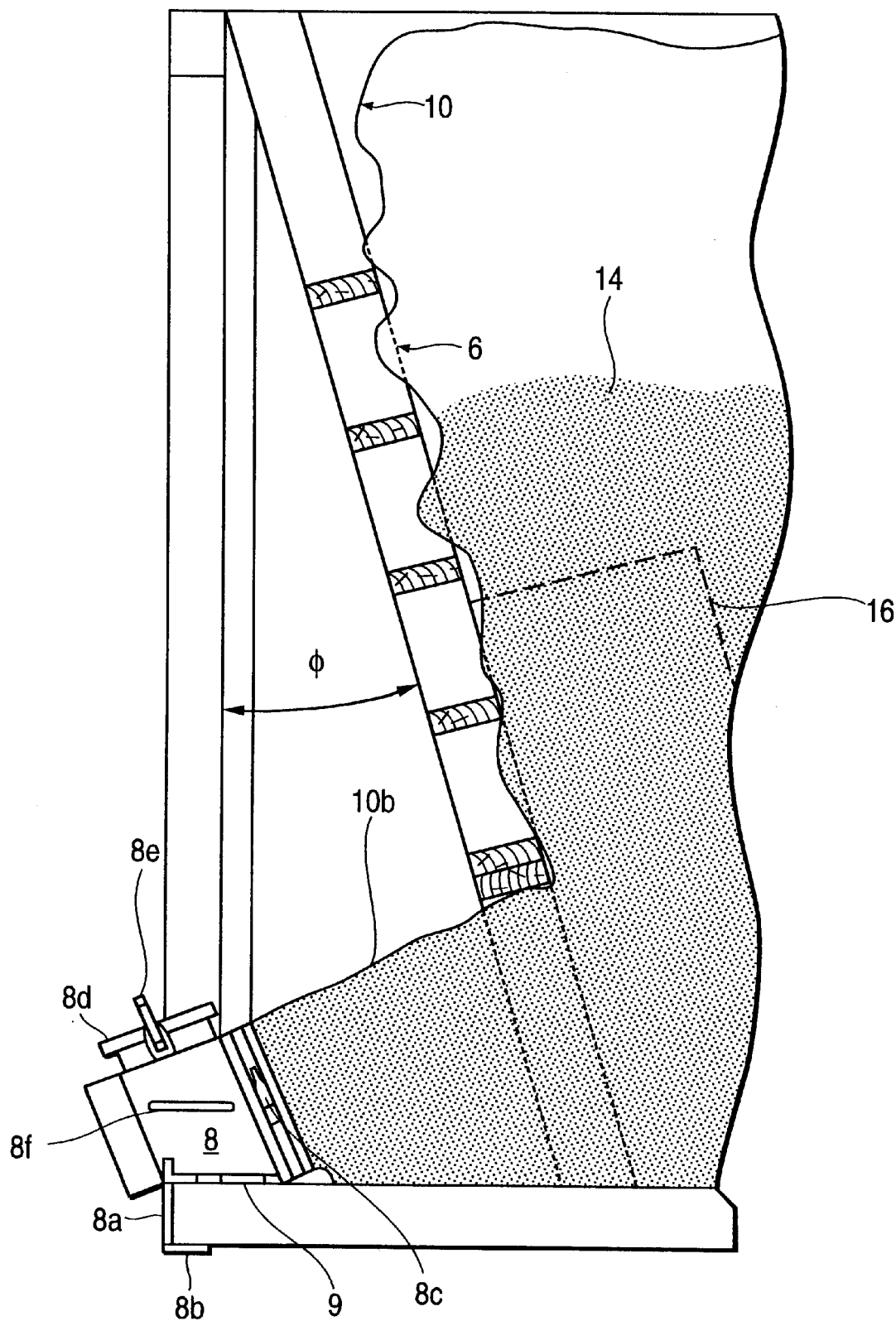
FIG. 5 is a cross-sectional view taken along line V—V in FIG. 4.

FIG. 5 is a cross-sectional view taken along line V—V in FIG. 4. That is, FIG. 5 is taken from a plane parallel to a side of the container. In FIG. 5, reference numeral 14 represents the level of powdered chemical in the container. FIG. 5 shows that the bulk head 6 is at an angle $\Phi$ to the back of the container.

FIG. 5 shows the leg 8a of the unloading adapter 8 and also shows the foot 8b attached to the leg 8a. The adapter 8 has a toggle band clamp 8c. Towards the back of the container, the liner 10 has two layers, an inner liner and an outer liner. The outer and inner liners are also referred to herein as auxiliary and main liners, respectively. The outer liner is cemented/glued to the inner liner and is also tied to the container/trailer and/or the bulkhead to make sure it is positioned properly. The outer liner extends under the inner liner a few feet which helps to hold the outer liner in place once the weight of the contents is pressing downward on the liner. The length in the direction of the container door, ideally is just enough to reach the adapter and be stretched tight under the toggle clamp.

When loading the dry chemical into the liner, both the inner and outer liners are tied-off at the outlet of the liner. When the dry chemical is to be unloaded, the inner liner is placed within the unloading adapter 8 and the outer liner is placed around an outer periphery of the unloading adapter 8. The toggle band clamp 8c secures the outer liner to the outer periphery of the unloading 8. An access door 8d is then opened and the inner liner is untied. When untied, the access door 8d is closed and a quick lock mechanism 8e locks the access door 8d shut. The unloading adapter has handles 8f (only one can be seen in FIG. 5), and the function of handles 8f will be described later. Reference numeral 16 represents a support piece shown in dotted lines. The support piece 16 is between the liner 10 and side wall 4 (see FIG. 4) of the container to push the liner away from the side wall 4 of the container. One support piece 16 is provided at each of the two side walls 4.

The converging angle of the funnel extension 10b, the inlet/outlet size of the funnel extension 10b and the angle the funnel extension 10b forms with floor 3 must be compatible with the particular product being shipped.

Figure 6:
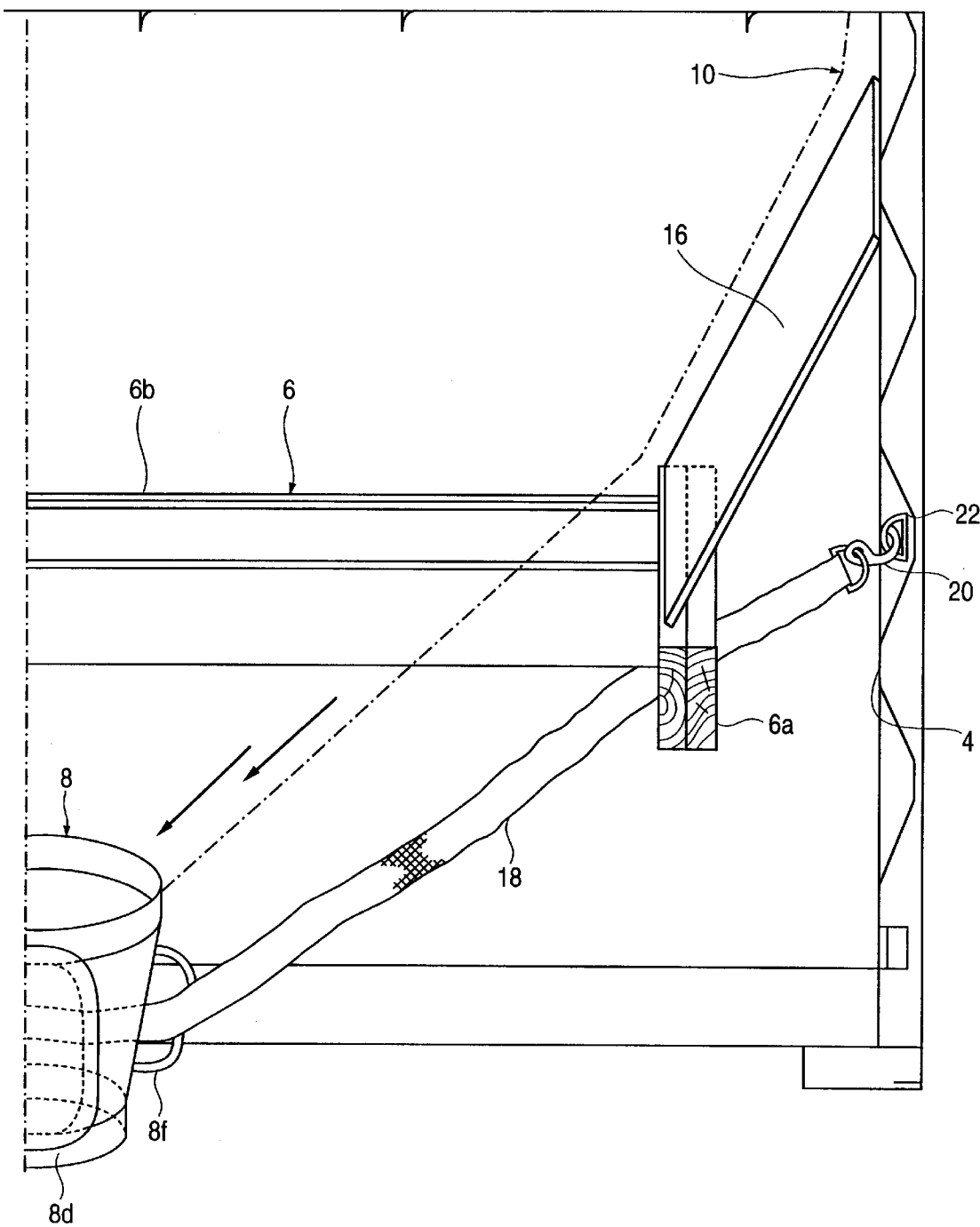
FIG. 6 is a cross-sectional view taken along line VI—VI of FIG. 4.

FIG. 6 is a cross-sectional view taken along line VI—VI of FIG. 4. That is, FIG. 6 is taken from a plane parallel to the top of the container. FIG. 6 is helpful in showing the function of handles 8f. Handles 8f allow the unloading adapter 8 to be carried. Also, handles 8f secure the unloading adapter 8 to the container structure. A tie-down strap 18 is fastened with hooks 20 to rings 22 attached to the container side wall 4. Tie-down strap 18 extends through one handle 8f, under the unloading adapter 8 and through the opposing handle 8f. Then, the other side of the tie-down strap 18 is fastened to an opposite side wall 4 of the container as discussed above. The tie-down strap 18, provides a retention force to offset the force of the unloading chemical.

FIG. 6 also shows how the support pieces 16 support the liner 10 away from the sides 4 of the container. Support piece 16 may simply be a piece of plywood, and more particularly may be 24 inch×48 inch piece of plywood. The purpose of support piece 16 is to have the shape of the funnel extend further into the container, beyond the bulk head 6. It is possible that the outer liner would have sufficient strength on its own to support the liner 10 away from the sides 4 of the container. In this case, the outer liner would be secured to the side of the container (with ropes) and would act like a bra, and the support pieces 16 may not be necessary.

Figure 7:
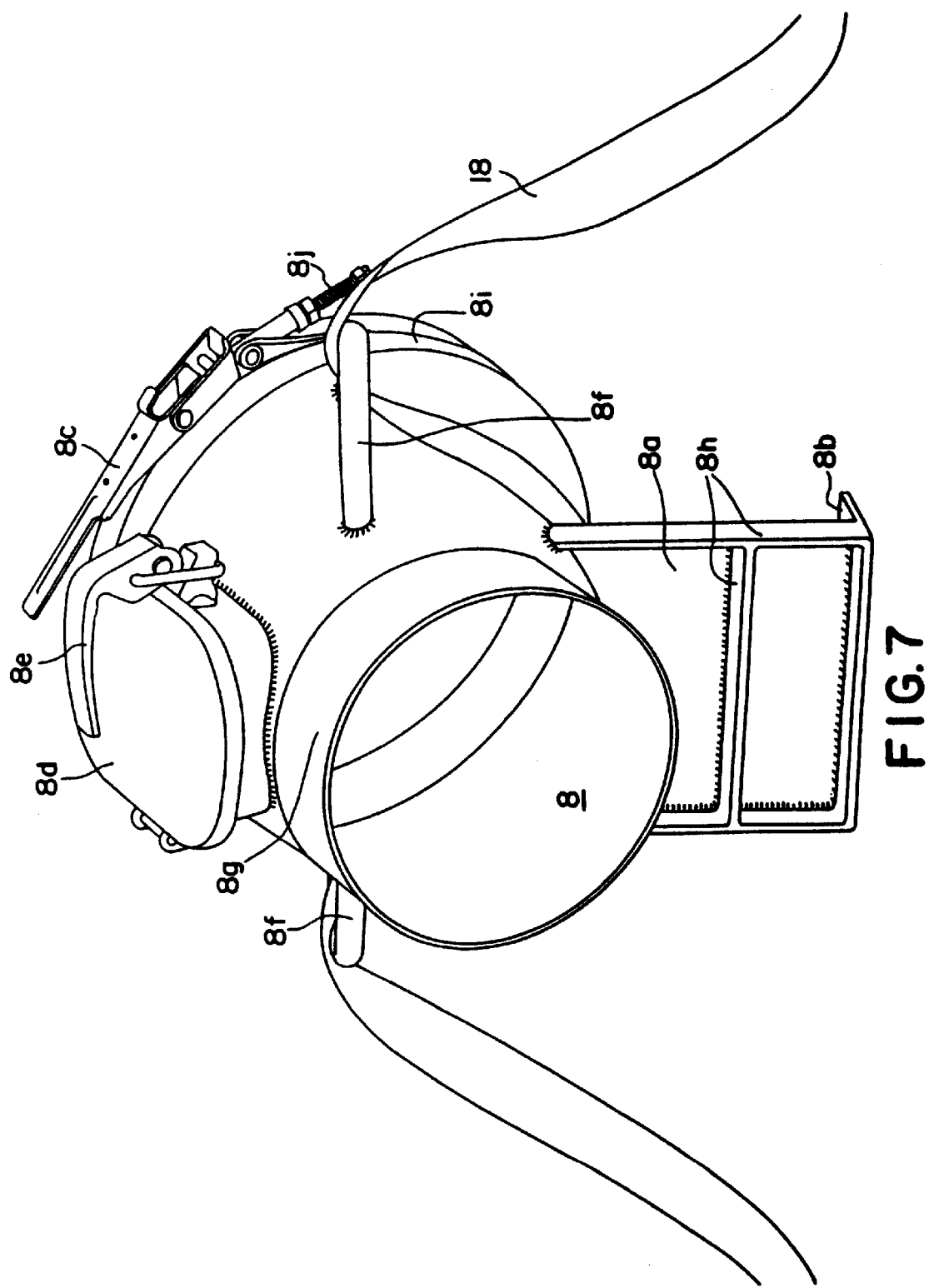
FIG. 7 is a detailed perspective view of the unloading adapter.

FIG. 7 is a detailed perspective view of the unloading adapter 8. FIG. 7 shows that the toggle band clamp 8c is provided with an adjusting screw 8j for adjusting the circumference of the toggle band when the toggle band clamp 8c is clamped. FIG. 7 also shows that the unloading adapter 8 has an outer end 8g which attaches to chemical unloading equipment. The leg 8a and foot 8b are shown in detail in FIG. 7. Note that the leg 8a has support members 8h. The length of the leg 8a is at least as long as a thickness of the bottom of the container. This allows the foot 8b to fit under the container. A pad under an input 8i of the adapter 8 rests on the bed of the container to slightly elevate the unloading adapter 8 above the bed of the container. The leg 8a should at least be as long as the thickness of the bed of the container plus the width of the pad 9. The input lip 8i should be able to be elevated slightly above the pad 9. The purpose of the elevation is to provide room for securing the outer liner to the adapter 8. Further, because positioning of the liner 10 in the container will vary, it is quite possible that there will be excess liner material at the back of the container. The excess liner material can be folded under the input lip 8i in the adapter 8. With the leg 8a, the adapter 8 is held down against an upward force of the tie-down strap 18. Leg 8a also positions the adapter.

Figure 8:
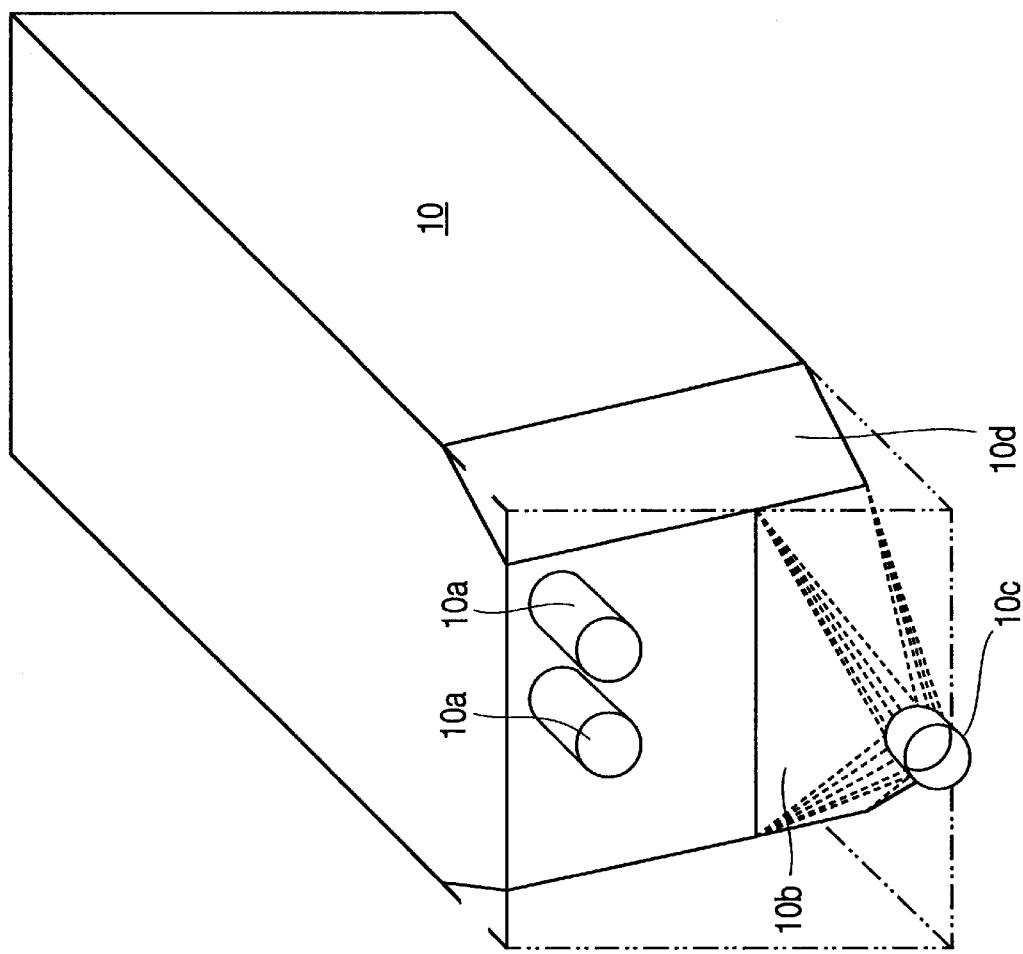
FIG. 8 is a perspective view of the liner shown in FIGS. 4–6.

FIG. 8 is a perspective view of the liner 10 shown in FIGS. 4–6. As can be seen from FIG. 8, the funnel extension 10b is part of the liner 10. The funnel extension 10b ends in an outlet 10c. The liner has narrowed side portions 10d. The narrowed side portions 10d conform to the shape of the support pieces 16 and allow the funnel shape to extend into the container, past the bulk head. As mentioned above, it is possible that the support pieces 16 may not be necessary and that the narrowed side portions 10d will have enough strength on their own to continue the funnel shape past the bulk head. It is apparent that behind the narrowed side portions 10d, the liner 10 has a shape which substantially conforms to the container. The inner liner and outer liner have substantially the same shape, and thus FIG. 8 represents both the inner and outer liner. As with the conventional liner, the inner and outer liner are formed of a polymer material, such as polyethylene or polypropylene. Since the inner liner serves primarily to contain and seal and the outer liner serves primarily to support, they will likely be of dissimilar materials. For example, the outer liner could be formed of a woven polypropylene similar to that used in flexible intermediate bulk containers (Super Sacks™).

With the present invention, when the purchaser receives shipped chemicals, the purchaser is able to attach unloading equipment in a predetermined manner which avoids make shift connections. The dry chemical can be easily and more quickly unloaded from the liner of the intermodal shipping container. The container is tilted in a manner similar to the conventional system. The dry chemical begins to flow from the liner at a lower angle of inclination and flows through a larger portion of the outlet than was conventionally utilized.

The bulk head of the present invention is held in place with the pressure of the dry chemical. Only a few nails or screws are necessary to hold the bulk head in place before the liner is filled. With the present invention, a dry chemical raw material can be shipped to a plant, and the dry chemical can be used to produce a dry chemical product. The dry chemical product can be shipped from the plant in the same container. For example, purified terephthalic acid powder can be shipped to a plant, polyethylene terephthalate can be manufactured, and the polyethylene terephthalate (PET) pellets can be shipped in the same container. To ship the PET, all that is necessary is to remove the bulk head, change the liner and reinstall the bulk head. It is not necessary to rebuild a new bulk head. The angles the bulk head 6, funnel extension 10b and support piece 16 make with the respective portions of the container can be varied to accommodate the characteristics (for example angle of repose) of the dry chemical being shipped.

While the invention has been described in connection with the preferred embodiments, it will be understood that modifications within the principle outlined above will be evident to those skilled in the art. Thus, the invention is not limited to the preferred embodiments, but is intended to encompass such modifications.

What is claimed is:

1. A system for transporting dry chemicals in a container, comprising:

a removable bulk head having a top and a bottom, the bulk head being tilted when installed in the container such that the top of the bulk head is at the back of the container and the bottom of the bulk head is recessed into and toward a front of the container, the bulk head having an opening defined by a rim at a bottom center portion of the bulk head; and a liner fitting within the container, the liner having a funnel extension fitting through and extending from the opening in the bulk head, the funnel extension being supported by the rim of the bulk head and having a diameter that decreases toward the back of the container, with increasing distance from the bulk head.

2. A system according to claim 1, wherein the container has a width and the funnel extension extends across substantially the entire width of the container.

3. A system according to claim 1, wherein the container has a height, the bulk head has a length extending between the top and the bottom, and the length of the bulk head is greater than the height of the container.

4. A system according to claim 1, further comprising an auxiliary liner fitting around the funnel extension, the auxiliary liner having means for fastening to the container.

5. A system according to claim 1, wherein the liner has sides, the system further comprising support pieces recessed into the container from the bulk heads, for supporting the sides of the liner away from the container toward the back of the container such that the distance between the sides of the liner and the container increases toward the back of the container.

6. A system for transporting dry chemicals in a container, comprising:

a liner fitting within the container and having a funnel opening;

a hollow transition adapter having an input, an output, a hollow interior and an access opening between the input and the output, the opening of the liner fitting around the input of the transition adapter; and an access door attached to the transition adapter between the input and the output to selectively cover the access opening, the access door allowing operator access to the interior of the transition adapter through the access opening when the liner is fit around the input of the transition adapter.

7. A system according to claim 6, further comprising a clasp surrounding the input of the transition adapter, the clasp being movable between open and closed positions such that in the open position, a clearance exists between the clasp and the input of the transition adapter, and in the closed position, the clasp is secured against the liner and the input of the transition adapter.

8. A system according to claim 6, wherein the liner includes a main liner and an auxiliary liner, the main liner fitting inside the input of the transition adapter to be positioned within the interior of the transition adapter, the auxiliary liner fitting around the input of the transition adapter to remain on an exterior of the transition adapter.

9. A system according to claim 6, wherein the container has a bed on which the liner rests, the system further comprising a claw portion attached to the transition adapter, for sliding under the bed of the container.

10. A system according to claim 9, wherein the bed of the container has a thickness, the claw portion has a foot and a leg, the foot fits under the bed of the container, the leg connects the foot and the transition adapter, and the leg has a height greater than the thickness of the bed of the container to allow the transition adapter to be positioned above the bed of the container.

11. A system for transporting dry chemicals in a container, comprising:

a removable bulk head having a top and a bottom, the bulk head being tilted when installed in the container such that the top of the bulk head is at the back of the container and the bottom of the bulk head is recessed into the container, the bulk head having an opening defined by a rim at a bottom center portion of the bulk head thereof;

a liner having an opening, fitting within the container, the liner having a funnel extension fitting through and extending from the opening in the bulk head, the funnel extension being supported by the rim of the bulk head and having a diameter that decreases toward the opening in the liner, with increasing distance from the bulk head;

a hollow transition adapter having an inputs, an output, a hollow interior and an access opening between the input and the output, the opening of the liner fitting around the input of the transition adapter; and an access door attached to the transition adapter between the input and the output to selectively cover the access door opening, the access door allowing operator access to the interior of the transition adapter through the access opening when the liner is fit around the input of the transition adapter.

* * * * *

UNITED STATES PATENT AND TRADEMARK OFFICE
CERTIFICATE OF CORRECTION

PATENT NO.  : 5,975,642
DATED       : November 2, 1999
INVENTOR(S) : Merton L. DIBBLE et al.

It is certified that error appears in the above-identified patent and that said Letters Patent is hereby corrected as shown below:

Col. 8, line 31, change "inputs," to --input,--.

Signed and Sealed this

Eleventh Day of July, 2000

Attest:

Q. TODD DICKINSON

*Attesting Officer*   *Director of Patents and Trademarks*